Jan. 3, 1928.
A. W. HANNAH
BRAKE MECHANISM
Filed Nov. 22, 1926
1,655,366
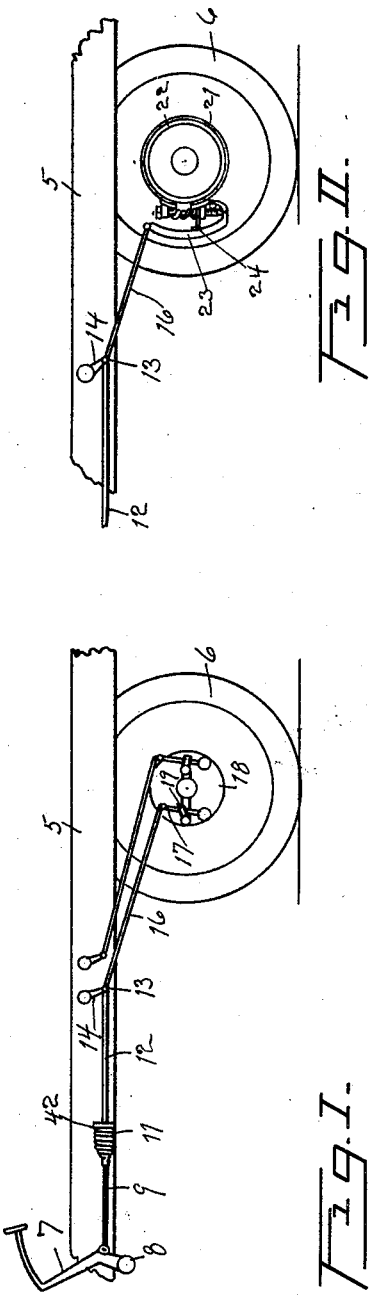
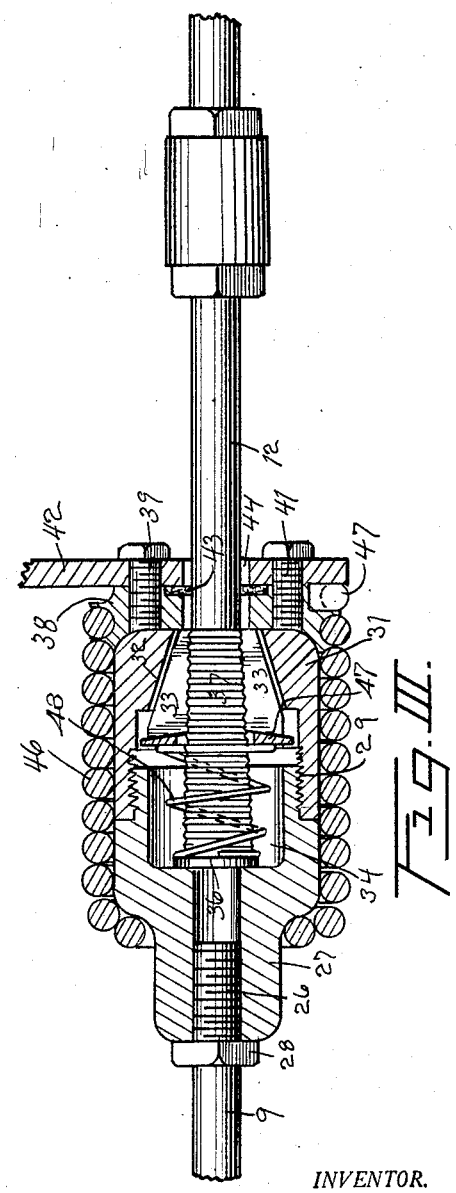
INVENTOR.
A. W. HANNAH
BY Victor J. Evans
ATTORNEY Patented Jan. 3, 1928.

1,655,366

UNITED STATES PATENT OFFICE.

ARTHUR W. HANNAH, OF SAN FRANCISCO, CALIFORNIA.

BRAKE MECHANISM.

Application filed November 22, 1926. Serial No. 149,926.

This invention relates to improvements in brake mechanisms and has particular reference to means for taking up the slack in a brake rod irrespective of whether the vehicle is under load or empty.

Another object of the invention is to provide a device of this character which may be inserted in the customary braking mechanism without altering the construction of the same.

A further object is to produce a device of this character which is neat in appearance, simple in construction and cheap to manufacture.

Other objects and advantages will be apparent during the course of the following description;

In the accompanying drawings forming a part of this specification, and in which like numerals are employed to designate like parts throughout the same, Figure I is a fragmentary view showing a portion of a chassis and the braking mechanism of an automobile having my device applied thereto, Figure II is a fragmentary view similar to Figure I showing a stop plate, and Figure III is a horizontal cross-section of my device.

When the brakes of an automobile are properly adjusted, the movement of a fraction of an inch may be sufficient to cause the brakes to drag. If the brakes are not properly adjusted the same will not take hold until the foot pedal has been moved through a considerable arc with the result that there is in this instance, very little additional reserve movement through which the pedal may be pushed, to accommodate for the wearing of the brakes. Therefore, it is common to make the brakes as tight as possible when adjusting the same without permitting them to contract, and in so doing it has been found that when the automobile is loaded the downward movement of the springs will cause the rear axle to move rearwardly a slight distance.

This rearward movement is often sufficient to shorten the brake rod and therefore cause the brakes to drag.

It is to overcome this difficulty that I have devised my present invention, wherein the numeral 5 designates the chassis of a motor vehicle having rear wheels 6 and the customary brake drums thereon.

At 7, I have shown a brake pedal pivoted to the chassis as at 8 and having a brake rod 9 pivoted thereto. It is within this brake rod that I insert my device, the same being designated as a whole at 11 in Figure I.

For the convenience of differentiating between the portion of the brake rod connected to the pedal and that portion extending rearwardly, I will designate the rear portion by the numeral 12 which is pivoted as at 13 to a pivoted hanger 14.

A link 16 extends from the hanger to one of the brake arms 17. This brake arm is connected to the customary internal expansion type of brake mounted within the brake drum 18.

In order to prevent the brake arm 17 from moving beyond a certain point, a stop is provided at 19, the purpose of which will be hereinafter seen.

In the form illustrated in Figure II, the brake rod 12 is pivoted to the hanger 13 in which the link 16 extends. The only difference in this view being that an external contracting type of brake is shown at 21 which contracts around a brake drum 22, the contraction being accomplished by a lever 23 which abuts a stop 24.

Referring now to Figure III, it will be noted that the brake rod 9 is threaded as at 26 into a casting 27, and a lock nut 28 prevents the relative movement between the rod and the casting. This casting 27 is provided with a threaded connection 29 to a camming member 31, which camming member is bored in such a manner as to form a cam surface 32 against which a series of wedges 33 are adapted to operate.

A chamber 34 is formed within the casting 26 and accommodates the head 36 of the tapered end 37 of the rod 12. This tapered end 37 may be corrugated if desired, in which instance, the faces of the wedges 33 are also corrugated to correspond therewith.

A spring retainer is shown at 38 which spring retainer is bolted as by bolts 39 and 41 to a bracket 42 carried upon the frame 5.

A felt washer 43 is interposed between the spring retainer and the bracket in such a manner as to surround the rod 12 and to prevent dirt and other foreign substances passing through the bore 44 formed in the bracket and spring retainer.

A helical spring 46 has one end bent as shown at 47 so as to engage a suitable socket formed in the spring retainer 38. This spring retainer is also engaged by several convolutions of the spring 46 while the remainder of the spring surrounds the camming member 31 and the major portion of the casting 27.

It will be noted that the casting 27 in reduced adjacent its connection with the rod 9, which permits a portion of the spring 46 being contracted so as to engage this reduced portion of the casting. A washer 47 contacts the inner ends of the wedges 33, while a spring 48 contacts the washer 47 and also the head 36.

The result of this construction is that as soon as the parts are in the normal position as shown in the drawings, the brake lever 17 or the brake lever 23 will rest against their respective stops 19 or 24. Therefore, there will be no tension upon the rod 12, the head 36 of which will abut the casting 27 as shown in Figure III. The spring 46 will hold the casting and camming member in such a position that the ends of the wedges contacting the spring retainer will be forced inwardly against the action of the spring 48. While the parts are in the position, it will be apparent that the rod 12 may be moved back and forth without the wedges taking hold.

As soon as pressure is applied to the brake pedal 7, and a pullage exerted on the brake rod 9, the result will be that the casting 27 and camming member 32, will move away from the spring retainer rigidly mounted upon the bracket 42 with the result that the ends of the wedges 33 may be pushed outwardly through the bore in the camming member. This will bring the wedges against the camming surface 32 and with the action of the spring 48 upon the washer 47 all of the wedges will immediately begin to grip the tapered portion of the rod 12, with the result that further movement of the pedal 7 will cause the brakes to be applied.

As soon as the pressure upon the pedal is released, the parts will assume their normal position and the rod 12 will again be free to adjust itself with respect to the load upon the vehicle and the consequent variance due to the spring action of the vehicle springs.

It will thus be seen that I have devised a simple mechanism which will automatically adjust the take-up on the brake rod thereby providing a better pedal action.

It is to be understood that the form of my invention herewith shown and described is to be taken as a preferred example of the same and that various changes relative to the material, shape, size and arrangement of parts may be resorted to without departing from the spirit of the invention or the scope of the subjoined claims.

Having thus described my invention, I claim:—

1. In a brake mechanism of the character described, a casting adapted to have one end of a brake rod secured therein, a camming member secured to said casting, a plurality of wedges positioned within said camming member, a tapered brake rod positioned within said camming member and surrounded by said wedges, means for moving said wedges into engagement with said tapered rod, said means including a washer engaging said wedges, a spring interposed between said washer and the extremity of said tapered rod, said spring being secured to said rod as shown and described.

2. In a brake mechanism of the character described, a casting adapted to have one end of a brake rod secured therein, a camming member secured to said casting, a plurality of wedges positioned within said camming member, a tapered brake rod positioned within said camming member and surrounded by said wedges, means for moving said wedges into engagement with said tapered rod, said means including a washer engaging said wedges, a spring interposed between said washer and the extremity of said tapered rod, means for moving said wedges out of engagement with said rod, said means including a spring retaining member a bracket for supporting said spring retaining member, a spring secured to said retaining member and surrounding said camming member and said casting in such a manner as to normally cause said camming member to contact said spring retaining member.

In testimony whereof I affix my signature.

ARTHUR W. HANNAH.